June 11, 1940. W. VONSCHOTT 2,203,708
DEVIATION INDICATOR
Filed May 14, 1938
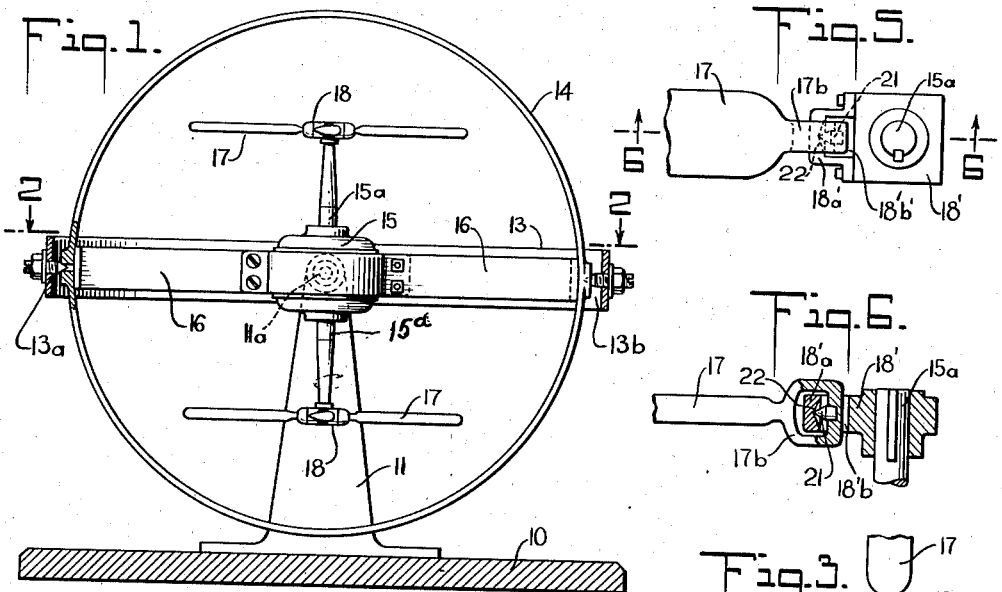
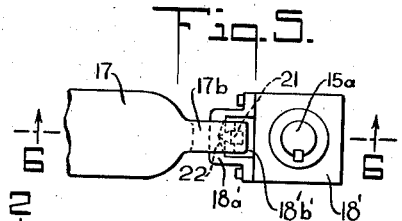
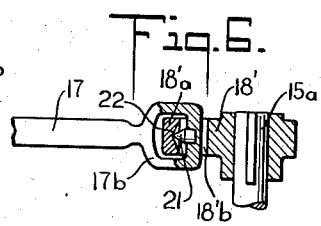
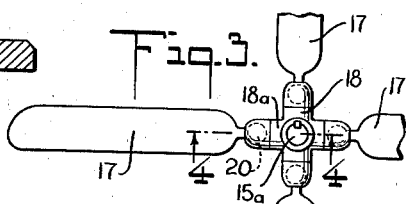
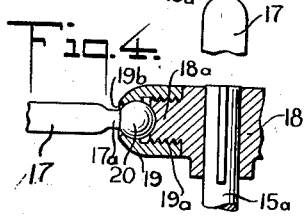
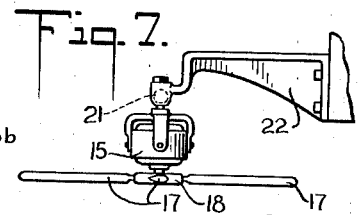
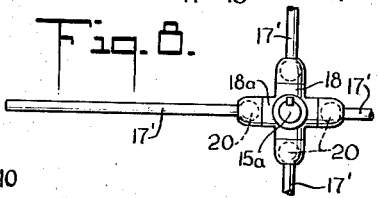
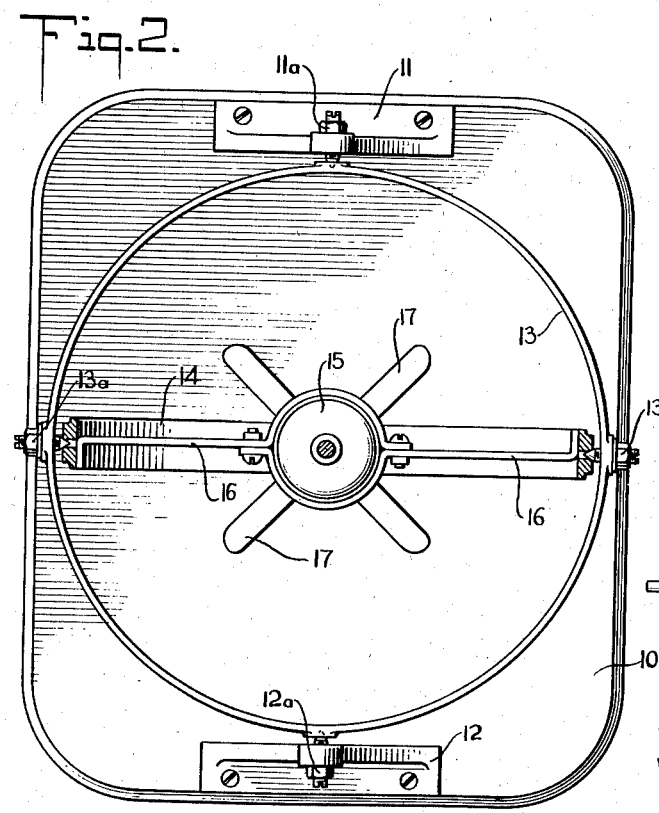
INVENTOR
William Vonschott
BY
HIS ATTORNEY Patented June 11, 1940

2,203,708

UNITED STATES PATENT OFFICE 2,203,708

DEVIATION INDICATOR

William Vonschott, New York, N. Y., assignor of one-fifth to Henry J. Lucke, New York, N. Y.

Application May 14, 1938, Serial No. 207,860

14 Claims. (Cl. 74—5)

My invention relates to devices for establishing and maintaining a reference line in a predetermined, preferably vertical, position, and for using such devices as deviation indicators.

More particularly, embodiments of my invention comprise one or more sets of weights, preferably in the form of blades, the blades of each set being articulatedly connected to a common rotating head of a body subject to angular deviation, the tendency of said body to deviate from a predetermined position under the action of disturbing forces being opposed by the tendency of said blades to preserve their plane of rotation, thereby either preventing the angular deviation of said body, or causing any oscillation of it due to such disturbing forces to be effectively dampened, thus establishing a definite reference line. Once such a reference line is established, the angular deviation of any other body from some other predetermined position may be ascertained, this other predetermined position being fixed relatively to said reference line.

The invention has a wide range of applications, notably in aviation, in carriages of guns mounted on ships or other transports, in devices for controlling the course of torpedoes, in establishing an artificial horizon, and in general, wherever a steady reference line is needed for either determining the deviation of an unstable body, or preventing or dampening its oscillation.

In addition to the main object of the invention, as above set forth, it is also an object of the present invention to attain the establishment and maintenance of a reference line by an instrument of relatively small overall dimensions as compared with present day approved and prior art devices of similar scope and character.

A further object of my invention is to produce a device of the nature described in which the form of the blades follows the streamline principle, i. e., is devoid of any angle of attack, although, for certain uses, a slight angle of attack may be advantageously employed without defeating the primary objects of the invention.

Further objects of the invention will become apparent from the specification which follows and from the drawing, in which:

Fig. 1 is a side elevation of the preferred form of my invention.

Fig. 2 is a horizontal section on line 2—2 of Fig. 1.

Fig. 3 is a front view of a set of blades and common mounting therefor.

Fig. 4 is a sectional view taken along the line 4—4 of Fig. 3, on an enlarged scale.

Fig. 5 is a front view of another form of a central mounting for a set of blades, but one blade being indicated.

Fig. 6 is a sectional view on line 6—6 of Fig. 5.

Fig. 7 is a side elevation of another embodiment of my invention.

Fig. 8 is a view corresponding to that of Fig. 3, but showing another embodiment of the invention.

Referring to the figures in detail, in Figs. 1, 2, 3 and 4, the device comprises a base 10 upon which are mounted oppositely positioned standards 11 and 12. At, or adjacent to, the upper ends of the respective standards 11, 12, at 11a, 12a, is pivotally mounted the ring 13, in which, in turn, is pivoted the inner ring 14, at diametrically opposite points, 13a, 13b. A motor 15, electrically or otherwise actuated, is mounted in the ring 14, as by means of the brackets 16. Two, preferably, but not necessarily, identical sets of blades 17 are revolubly mounted on the extensions 15a, 15a, of the motor shaft. When the two sets of blades are identical, they are mounted in balanced relation to one another, so that, in this particular case, the shaft extensions 15a, 15a, the motor 15, the ring 14, and the blades 17, inclusive of all mounting parts affecting these elements, are in balance when the motor shaft and blades are rotating, i. e., the center of oscillation of the system comprising these elements coincides with its center of gravity when the blades are set in rotation.

The blades 17 are universally attached to the studs 18a of head 18. The head 18 is provided with a central opening for receiving the free end of the shaft extension 15a and is removably and adjustably secured to it, as by means of a spline, as shown in Fig. 5. The universal connection between the blades 17 and the stubs 18a is shown as a socket 19 adapted to be removably attached to the stub 18a, as by screw threading 19a. The end 17a of the blade 17 is received through the opening 19b (Fig. 4), this end 17a being provided with a ball 20 which is revolubly held within the socket 19.

A somewhat different arrangement for connecting the blades to the head is shown in Figs. 5 and 6, in which the head 18' is provided with stubs 18'a recessed, as indicated at 18'b', the blade ending in a ring or equivalent formation 17b embracing the recessed portion 18'a.

Still another form of universal connection is shown in Fig. 6, wherein a conically tapered pin 21, carried by and projecting centrally within the ring portion 17b of the blade 17, is received within the conically concave portion 22 of the ring 18'a.

Suitable provision is made for limiting the range of drop or displacement of the blade relatively to the mounting means. In the forms shown in Figs. 3 and 4, the diameter of the opening 19b of the socket 19 is so dimensioned as to cause abutment between the blade portion 17a and the socket wall when the head 18 ceases to rotate or when the inclination of the blade tends to become excessive for any reason during the operation of the device. Similar limitations are imposed in the constructions illustrated in Figs. 5 and 6, as is obvious from the drawing.

The device is operative whether the center of gravity is below or coinciding with, the center of oscillation during the period of rotation of the blades or equivalent articulated members, the gyroscopic property of the device causing it to maintain its position during that period. The device is so designed, however, that, when at rest, it is always in stable equilibrium, the center of gravity being below the center of oscillation owing to the dropping of the blades or equivalent articulated members. To secure a center of gravity below the center of oscillation whether the blades are rotating or not, one may proceed as in Fig. 7, or in other ways, as, for instance, by making the lower set of blades in Figs. 1 and 2 heavier than the upper set, or by making the lower shaft extension longer than the upper. However, the arrangement whereby the centers of gravity and of oscillation coincide during the period of rotation of the blades is preferred for the reason that the device is then less subject to disturbances due to external forces, since these forces, transmitted to the instrument through its center of gravity, would be without effect on its operative efficiency.

The embodiments shown in Fig. 7 follow the general principles of the embodiments of my invention set out hereinabove. In the pendulum-like type illustrated in Fig. 7, the set of blades 17 are articulatedly related to their central rotating head 18 similarly as above, the head being adjustably attached to the rotor shaft of a motor 15, centrally supported and suspended by an arm the upper end of which is mounted in a universally supporting joint 21, but precluding rotation of the arm about its longitudinal axis. The housing of the universally supporting joint 21 is suitably supported with respect to a relatively stationary part of the structure of an airplane, gun mounting, or the like, as by means of the indicated bracket 22.

It should be also noted that the blades 17 need not be connected to the head by universal joints, although so shown in the drawing for purposes of illustration. It is sufficient to have free articulation about two axes in a plane perpendicular to the axis of the motor shaft, omitting freedom of rotation about an axis parallel to the axis of the motor shaft. However, the universal connection is preferred because of the greater facility of the blades to adjust themselves to every condition that may arise during the operation of the device.

Since the motor shaft takes a vertical position when the instrument is at rest, and it is this position which is maintained during the revolution of the shaft and blades, the reference line established and maintained by this instrument is the vertical. Obviously, any fixed line having a definite relation to the vertical will also have its position thus established and maintained, except in azimuth so that the invention actually provides for the establishment and maintenance of any predetermined reference line. The same holds for any predetermined reference plane, which may be an artificial horizon, i. e., a plane fixed definitely with regard to the horizontal plane.

When it is desired to determine the deviation of any body from the vertical, or from some predetermined reference line having a fixed relation to the vertical, all that is needed is to compare the position of that body with that of the reference line. There are, of course, many methods of procedure for doing this and for thus measuring or indicating the angle of deviation of the body, but such methods are too well known to require illustration and must be omitted from this specification, especially as they do not form any part of the present invention.

The operation of the device will now be explained and for this purpose the embodiment shown in Figs. 1 and 2, will be used.

At the start, the motor shaft is vertical. As the motor is actuated, the two heads 18 are set in rotation which is communicated to the blades 17 through their articulated connections with the stubs 18a of the heads 18. The center of gravity of the operating system moves up into coincidence with the center of oscillation. The system assumes the characteristics of a gyroscope with three degrees of rotational freedom. If no disturbing force acts on it, the motor shaft will maintain its vertical position. Translatory forces have no effect on it and will not disturb its equilibrium, but any external torque applied to this gyroscopic system will affect its equilibrium. For example let us assume that the torque is applied about an axis perpendicular to the plane of the sheet of the drawing, Fig. 1, and that the rotational impulse is clock-wise, looking down on the sheet. Let us further assume that the motor shaft rotates clock-wise, looking from the bottom up. As is well known, the system will not turn about the axis, but will precess about an axis lying in the plane of the sheet and perpendicular to the motor shaft axis, in a clock-wise direction looking from right to left. But this precessional effect is different for the heads 18 as compared with that for the blades 17. The blades will merely turn in their sockets, without in any way affecting the equilibrium of the motor shaft, while the precessional effect on the heads 18 and stubs 18a will tend to incline the shaft out of the plane of the sheet. But the tendency of the whirling blades 17 to maintain their plane of rotation, in accordance with a well known principle of mechanics will give rise to a force couple at an angle with the direction of the stubs, which will oppose any deviation of these stubs and, therefore, of the motor shaft, and, if a deviation has actually occurred, the force couple will bring the motor shaft back into its vertical position. By properly correlating all the factors entering the matter, namely the comparative weights of the heads 18 and the blades 17, their respective moments of inertia, the speed of the motor, and the lengths of the stubs 18a, it is possible to either obtain complete equivalence between the precessional effect on the heads 18 and the force couple, so as to prevent any deviation of the motor shaft, or to cause the force couple to effectively dampen any oscillation of the system that may occur as a result of the disturbing force. In establishing full or partial equivalence between the precessional effect and the force couple, the effect of friction, especially in the articulated joints, may be properly taken into account.

It must be clear from the above description of the operation of the device that it is not necessary to give the articulated members any particular form. In lieu of blades 17, I may employ any system of weights having a similar balanced relation to one another. I have shown such weights in the form of blades because this form offers certain advantages, the principal one being that, as the blades cut the air in their whirling motion, the pressure of the air opposes the rotation of the blades in their sockets, causing them to maintain their faces in a horizontal plane. Generally, I prefer to have the blades stream-lined to avoid any tendency to create lift which would be the case if, for instance the blades had an angle of attack, like the wings of an aeroplane. When the articulated members have not the form of blades, they are preferably made in the form of bodies of revolution, as for instance, in the form of cylindrical rods 17', as appears in Fig. 8.

Assuming my deviation indicating device to be utilized on an airplane, its base, such as the base 10 of the embodiment illustrated in Figs. 1 and 2, is affixed to a suitable normally horizontally disposed face of any suitable portion of the structure of the airplane, i. e., to locate the mean plane of the base in the plane of the horizontal when the central axis of the airplane is coincident with the horizontal. In the event of deviation of the path of travel of the airplane from its course, either voluntary or involuntary, the base 10 of my deviation indicating device is displaced from the horizontal correspondingly, and by reason of the universally articulated assembly of the respective rings 13, 14, the ring 14 is displaced relatively to the horizontal in correspondence with the extent of deviation of the mean normally horizontal plane of the airplane structure relative to the horizontal, as becomes apparent visually to the operator by the deviation of such rings relative to the base. The extent of such deviation from the vertical effected by my deviation indicating device, if desired, may be determined or computed in accordance with principles well known to those skilled in the art.

This application is in part a continuation of my copending application Serial No. 46,232, filed October 22, 1935, entitled Deviation indicators.

Whereas, I have described my invention by reference to specific forms thereof, it will be understood that many changes and modifications may be made without departing from the spirit of the invention.

I claim:

1. In a deviation indicating device, a universally suspended symmetrical body rotatable about its axis of symmetry, mutually angularly displaceable elements for supporting said universally suspended body, a plurality of members mutually balanced relatively to said axis and pendulously connected to said body at points equally spaced from said axis, said members possessing at least two degrees of rotational freedom about said points relatively to said body, and means for rotating said body and therewith said members about said axis.

2. In a deviation indicating device, a universally suspended symmetrical body rotatable about its axis of symmetry, mutually angularly displaceable elements for supporting said universally suspended body, a plurality of members mutually balanced relatively to said axis and universally and pendulously connected to said body at points equally spaced from said axis, said members having three degrees of rotational fredom about said points, and means for rotating said body and therewith said members about said axis.

3. In a deviation indicating device, a universally suspended symmetrical body rotatable on an axle constituting its axis of symmetry, including a head on said body adjacent each end of said axle, a plurality of members mutually balanced relatively to said axis and pendulously and articulatedly connected to said heads at points equally spaced from said axis, said members possessing at least two degrees of rotational freedom relatively to said body, and means for spinning said body and members on said axle, the center of the universal suspension of said body and members considered as a unit coinciding with its center of gravity when said body is spinning.

4. In a deviation indicating device, a symmetrical body universally suspended in stable equilibrium when at rest and rotatable about its axis of symmetry, mutually angularly displaceable elements for supporting said universally suspended body, a plurality of members mutually balanced relatively to said axis and pendulously connected to said body at points equally spaced from said axis, said members possessing at least two degrees of rotational freedom about said points relatively to said body, and means for spinning said body and therewith said members about said axis, the center of gravity of said body remaining below the points of its universal suspension when said members are directed at right angles to said axis.

5. In a deviation indicating device, a symmetrical body universally suspended in stable equilibrium when at rest and rotatable about its axis of symmetry, mutually angularly displaceable elements for supporting said universally suspended body, a plurality of members mutually balanced relatively to said axis and pendulously connected to said body at points equally spaced from said axis, said members possessing at least two degrees of rotational freedom about said points relatively to said body, and means for spinning said body and therewith said members about said axis, the center of gravity of said body coinciding with the center of its suspension when said members are directed at right angles to said axis.

6. In a deviation indicating device, a universally suspended symmetrical body rotatable on an axle constituting its axis of symmetry, including a head on said body adjacent each end of said axle, the two heads being equidistant from the center of the universal suspension of said body, a plurality of members mutually balanced relatively to said axis and pendulously and articulatedly connected to said heads at points equally spaced from said axis, each of said members being free to revolve upon itself about an axis perpendicular to said axis of symmetry and possessing a limited degree of rotational freedom about a third axis perpendicular to the two first mentioned axes, and means for spinning said body and members on said axle, the center of universal suspension of said body and members considered as a unit coinciding with its center of gravity when said balanced members are directed at right angles to said axis of symmetry.

7. In a deviation indicating device, a universally suspended symmetrical body rotatable about its axis of symmetry, mutually angularly displaceable elements for supporting said universally supporting body, a plurality of blades mutually balanced relatively to said axis and pendulously connected to said body at points equally spaced from said axis, said blades possessing at least two degrees of rotational freedom about said points relatively to said body, and means for rotating said body and therewith said members about said axis.

8. In a deviation indicating device, a universally suspended symmetrical body rotatable about its axis of symmetry, mutually angularly displaceable elements for supporting said universally suspended body, a plurality of streamlined blades, mutually balanced relatively to said axis and pendulously and articulatedly connected to said body at points equally spaced from said axis, said blades possessing at least two degrees of rotational freedom relatively to said body, and means for rotating said body and therewith said members about said axis.

9. In a deviation indicating device, a universally suspended symmetrical body rotatable on an axle constituting its axis of symmetry, mutually angularly displaceable elements for supporting said universally suspended body, a head on said body adjacent an end of said axle, arms extending laterally from said head, a member pendulously connected to each arm adjacent its free end and possessing at least two degrees of rotational freedom relatively thereto, said members being mutually balanced relatively to said axis, and means for rotating said body and therewith said members about said axis.

10. In a deviation indicating device, a universally suspended symmetrical body rotatable on an axle constituting its axis of symmetry, mutually angularly displaceable elements for supporting said universally suspended body, a head on said body adjacent each end of said axle, arms extending laterally from said heads, a blade universally and pendulously connected to each arm adjacent its free end and possessing three degrees of rotational freedom relatively thereto, means for limiting said rotational freedom, and means for rotating said body and therewith said members on said axle.

11. In a deviation indicating device, a universally suspended symmetrical body rotatable on an axle constituting its axis of symmetry, mutually angularly displaceable elements for supporting said universally suspended body, a head on said body adjacent each end of said axle, arms extending laterally from said heads, a blade pendulously and articulatedly connected to each arm and possessing at least two degrees of rotational freedom relatively thereto, and means for rotating said body and therewith said members about said axis.

12. In a deviation indicating device, a universally suspended symmetrical body rotatable about its axis of symmetry, mutually angularly displaceable elements for supporting said universally suspended body, a plurality of members mutually balanced relatively to said axis and pendulously and articulatedly connected to said body at points equally spaced from said axis, said members possessing at least two degrees of rotational freedom about axes perpendicular to said axis of symmetry, and means for rotating said body and therewith said members about said axis of symmetry.

13. In a deviation indicating device, a universally suspended symmetrical body rotatable about its axis of symmetry, mutually angularly displaceable elements for supporting said universally suspended body, a plurality of identical members symmetrically disposed around said body and pendulously and articulatedly connected thereto at points equally spaced from said axis, each one of said members being free to revolve upon itself about an axis perpendicular to said axis of symmetry and possessing a limited degree of rotational freedom about a third axis perpendicular to the two first mentioned axes, and means for rotating said body and therewith said members about said axis of symmetry.

14. In a deviation indicating device, a universally suspended symmetrical body rotatable about its axis of symmetry, mutually angularly displaceable elements for supporting said universally suspended body, a plurality of identical members symmetrically disposed around said body and universally pendulously connected thereto at points equally spaced from said axis, said members having three degrees of rotational freedom about said points, means for limiting said rotational freedom, and means for rotating said body and therewith said members about said axis.

WILLIAM VONSCHOTT.